(12) United States Patent
Xu et al.

(10) Patent No.: US 11,674,871 B2
(45) Date of Patent: Jun. 13, 2023

(54) BAUSCHINGER EFFECT TEST FIXTURE

(71) Applicant: BEIJING INSTITUTE OF TECHNOLOGY, Beijing (CN)

(72) Inventors: Chunguang Xu, Beijing (CN); Shuangyi Li, Beijing (CN); Zhaowei Miao, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 251 days.

(21) Appl. No.: 17/332,372

(22) Filed: May 27, 2021

(65) Prior Publication Data

US 2022/0065763 A1 Mar. 3, 2022

(30) Foreign Application Priority Data

Aug. 26, 2020 (CN) .......................... 202010870645.6

(51) Int. Cl.
G01N 3/04 (2006.01)
G01N 3/08 (2006.01)

(52) U.S. Cl.
CPC .............. *G01N 3/04* (2013.01); *G01N 3/08* (2013.01); *G01N 2203/0003* (2013.01);
(Continued)

(58) Field of Classification Search
CPC .... G01N 3/04; G01N 3/08; G01N 2203/0019; G01N 2203/0268; G01N 2203/0676;
(Continued)

(56) References Cited

U.S. PATENT DOCUMENTS 5,237,876 A * 8/1993 Liu .......................... G01N 3/04
73/831

FOREIGN PATENT DOCUMENTS

CN 106483025 A * 3/2017
CN 206410934 U 8/2017
(Continued)

OTHER PUBLICATIONS

Zhuang Jingbiao, Liu Dihui, Li Guangyao, Simulation Analysis of Springback Based on Bauschinger Effect, State Key Laboratory of Advanced Design and Manufacturing of Automobile Body, Hunan University, 2013, pp. 84-90, vol. 49, Issue 22.
(Continued)

*Primary Examiner* — Jonathan M Dunlap
(74) *Attorney, Agent, or Firm* — Shumaker, Loop & Kendrick, LLP; John A. Miller

(57) ABSTRACT

A Bauschinger effect test fixture that cooperates with a test machine for stretching and compressing materials to perform a Bauschinger effect test on a test piece having a symmetrical configuration with two wide ends and a narrow middle part. The fixture includes two identical split bodies, where each split body has a base provided, longitudinally from a central part to one end of the base, with a limiting groove corresponding to a half of the profile of the test piece. Two sides of the groove are arranged symmetrically with a plurality of threaded through holes and a cover is provided along its central axis with two threaded through holes with which the test piece is pressed tightly by bolts. An end of the cover corresponding to a notch of the limiting groove is provided with a through groove configured for placing a stress ultrasonic detection probe on the test piece.

3 Claims, 2 Drawing Sheets

(52) U.S. Cl.
CPC ........... *G01N 2203/0017* (2013.01); *G01N 2203/0019* (2013.01); *G01N 2203/0098* (2013.01); *G01N 2203/0258* (2013.01); *G01N 2203/0268* (2013.01); *G01N 2203/0423* (2013.01); *G01N 2203/0658* (2013.01); *G01N 2203/0676* (2013.01)

(58) Field of Classification Search
CPC ... G01N 2203/0258; G01N 2203/0003; G01N 2203/0017; G01N 2203/0098; G01N 2203/0658; G01N 2203/0423
See application file for complete search history.

(56) References Cited

FOREIGN PATENT DOCUMENTS

| | | | | |
|---|---|---|---|---|
| CN | 107449664 | A | | 12/2017 |
| CN | 208505772 | U | | 2/2019 |
| CN | 111238702 | A | | 6/2020 |
| CN | 210803117 | U | | 6/2020 |
| CN | 111426555 | B | * | 3/2021 |
| CN | 113281165 | B | * | 9/2022 ............... G01N 3/04 |

OTHER PUBLICATIONS

Liu Dihui, Zhuang Jingbiao, Li Guangyao, Research on Bauschinger Effect of Sheet Metal by Experiments, China Mechanical Engineering, 2013, pp. 542-546, 556, vol. 24, Issue 4, Hunan University.

\* cited by examiner

BAUSCHINGER EFFECT TEST FIXTURE

CROSS-REFERENCE TO RELATED APPLICATIONS

This application claims priority to China Patent Application Serial No. 202010870645.6 filed Aug. 26, 2020, the entire disclosure of which is herein incorporated by reference.

BACKGROUND

Field

The present disclosure relates to the technical field of material performance research, and in particular to a Bauschinger effect test fixture.

Discussion of the Related Art

In the process of metal plastic processing, there is a phenomenon that occurs on metal material in that a plastic strain strengthening caused by a forward loading leads a plastic strain softening (reduction in yield limit) during a subsequent reverse loading. This phenomenon was found by J. Bauschinger in the experiments on mechanical properties of the metal material in 1886. When the metal material is first stretched to a plastic deformation stage, then unloaded to zero, and then loaded in reverse, i.e., subjected to compression deformation, the compressive yield limit (as) of the material is significantly lower (in absolute terms) than the yield limit (as) of the material in the original state (i.e., in which the material is directly compressed without prior stretching plastic deformation). If the material is plastically deformed by compression and then stretched after being unloaded to zero, the tensile yield limit of the material is also reduced.

When a test machine for stretching and compressing materials is used to stretch and compress a strip-shaped metal material test piece to verify Bauschinger effect, the compression of the test piece may cause the test piece to be bent and buckling, so that the test cannot be completed.

ZHUANG Jingbao and LIU Dihui from Hunan University successively utilized a sheet Bauschinger effect test fixture in their papers titled "Analysis of Springback Simulation Based on Bauschinger Effect" and "Research on Bauschinger Effect of Sheet Metal by Experiments" which study Bauschinger effect of metal materials, the fixture adopting a working principle similar to that disclosed in the patent with the publication number of CN208505772U. The fixture mainly comprises an upper clamping block and a lower clamping block, wherein one end surface of each of the clamping blocks is an oblique end surface, and the two oblique end surfaces are mutually matched and slidable relative to each other. The two clamping blocks each have a through hole into which a compressed test piece is placed to limit bending of the test piece in the thickness direction. The fixture cannot be provided with an ultrasonic detection probe to detect the stress on the test piece, and there is therefore a need to redesign the Bauschinger effect test fixture.

SUMMARY

In view of this, a main objective of the present disclosure is to provide a Bauschinger effect test fixture to solve the problem that the existing test machine for stretching and compressing materials cannot complete the Bauschinger effect test.

The solution adopted by the present disclosure is a Bauschinger effect test fixture that cooperates with a test machine for stretching and compressing materials to perform the Bauschinger effect test on a test piece having a symmetrical strip-shaped configuration with two wide ends and a narrow middle part, wherein the test fixture comprises two identical split bodies, each split body comprising:

a base provided, longitudinally from a central part to one end of the base, with a limiting groove corresponding to a half of the profile of the test piece, wherein two sides of the limiting groove are arranged symmetrically with a plurality of threaded through holes; and a cover provided along its central axis with two threaded through holes with which the test piece is pressed tightly by bolts, wherein two sides of the cover are arranged symmetrically with a plurality of through holes which are connected with the plurality of threaded through holes of the base through bolts, wherein an end of the cover corresponding to a notch of the limiting groove is provided with a through groove configured for placing a stress ultrasonic detection probe on the test piece.

As stated above, the Bauschinger effect test fixture according to the present disclosure consists of the two identical split bodies, wherein the limiting grooves of the bases of the two split bodies jointly correspond to the shape of the test piece to be tested, and the test piece is of a structure with two wide ends and a narrow middle part. During the test, the test piece is placed in the limiting grooves of the bases of the fixture, the cover is then arranged at the upper part of the base, the cover is fixedly connected with the base through bolts, and at the same time, the wide end parts and the narrow middle parts of the test piece are also pressed tightly through bolts to ensure that the test piece cannot slide in the limiting groove. Then, the test fixture is installed on the test machine for stretching and compressing materials and applies compression force. The stress ultrasonic detection probe arranged on the test piece is used for detecting a change in the compression stress during the compression process and when the material is yielded and a change in the compression stress when the compression force is unloaded, and simultaneously obtaining the rule of a change in the compression stress when the material is compressed to failure, thereby verifying the Bauschinger effect of the material of the test piece.

Preferably, the other end of the base is provided with a protruding fixing part to which the test machine for stretching and compressing materials is fixedly connected through a pressing plate and applies a compression force.

As stated above, the other end of the base is provided with the fixing part, and when installing on the test machine for stretching and compressing materials, the fixing part is fixedly connected through the pressing plate of the test machine, thereby conveniently applying the compression force to the test piece in order to compress the test piece.

Preferably, an end of the limiting groove opposite the notch is arranged with gaskets with different thicknesses to generate different sizes of compressive stress on the test piece.

As stated above, since the mass-produced test pieces are slightly different in size, the test pieces may change in size after they are compressed. Generating of different sizes of compressive stress on the test piece can be realized by placing gaskets with different thicknesses on an end of the limiting groove, and the compression length of the test piece can also be controlled by placing gaskets with different thicknesses.

The Bauschinger effect test fixture according to the present disclosure is mainly used for compressing the test piece by using the test machine for stretching and compressing materials to verify the Bauschinger effect of the material. The fixture has the function of compressing and limiting the tested test piece, and solves the problem of being bent and buckling when the material of the test piece is subjected to plastic deformation by using the compression function of the test machine for stretching and compressing materials.

The foregoing description is only an overview of the technical solutions of the present disclosure, and in order to be able to understand the technical means of the present disclosure more clearly, the present disclosure may be implemented in accordance with the content of the description, and in order to make the above and other objects, features, and advantages of the present invention more obvious and understandable, the following detailed description is given with reference to the preferred embodiments in conjunction with the accompanying drawings.

BRIEF DESCRIPTION OF THE DRAWINGS

To more clearly illustrate the solutions of the embodiments of the present disclosure, the drawings of the embodiments will be briefly described below.

DETAILED DESCRIPTION OF THE EMBODIMENTS

Figure 1:
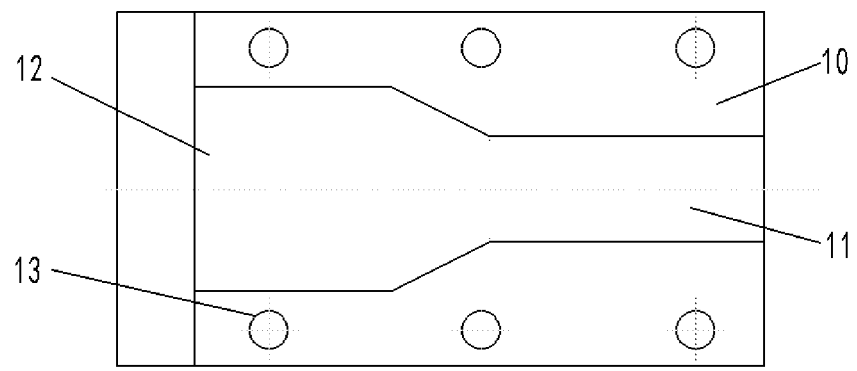
FIG. 1 is a structural schematic diagram of a base portion of a Bauschinger effect test fixture according to an embodiment of the present disclosure.
Figure 2:
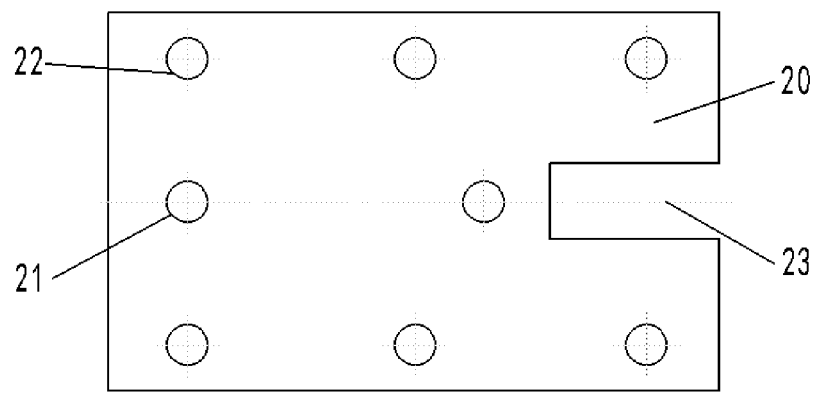
FIG. 2 is a structural schematic diagram of a cover portion of the Bauschinger effect test fixture according to an embodiment of the present disclosure.
Figure 3:
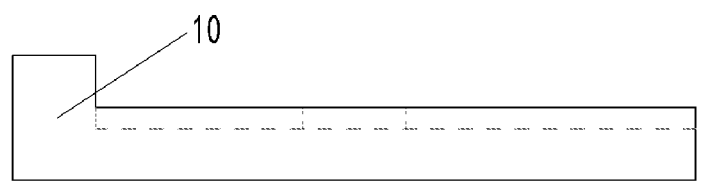
FIG. 3 is a front view of the base portion as shown in FIG. 1.
Figure 4:
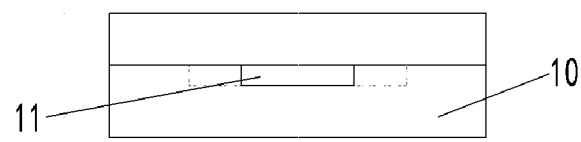
FIG. 4 is a right side view of the base portion as shown in FIG. 1.
Figure 5:
FIG. 5 is a front view of the cover portion as shown in FIG. 2.

The specific embodiments of the present disclosure, which as a part of this specification illustrate the principles of the present disclosure by way of examples, will be described in detail below with reference to the accompanying drawings, and other aspects, features and advantages of the present disclosure will become apparent from the detailed description. In the referenced drawings, identical or similar elements in different drawings are designated with identical reference numerals.

The present disclosure provides a test fixture for Bauschinger effect, which is mainly used for compressing a test piece on a test machine for stretching and compressing materials so as to realize the purpose of verifying the Bauschinger effect of the material, wherein the test piece usually has a strip-shaped configuration with two wide ends and a narrow middle part. The object targeted by the present disclosure is the test piece, which is bent and buckling when being compressed by the test machine for stretching and compressing materials.

As shown in FIGS. 1 to 5, the Bauschinger effect test fixture according to an embodiment of the present disclosure includes two identical split bodies, wherein each split body comprises a base 10 and a cover 20.

One end of the base 10 is provided with a fixing part with which a pressing plate on the test machine for stretching and compressing materials can be fixedly connected to the base conveniently. The base 10 is provided, longitudinally from the central part to the one end of the base, with a limiting groove 11 corresponding to a half of the profile of the test piece, so that the limiting grooves 11 of the bases of the two split bodies just accommodate the test piece and limit the test piece. An end part 12 of the limiting groove opposite a notch of the limiting groove may be arranged with gaskets with different thicknesses to generate different sizes of compression stress on the test piece so as to control the compression length of the test piece. Two sides of the limiting groove 11 are provided with a plurality of threaded through holes 13 which are symmetrically arranged.

The cover 20 is provided along its central axis with two threaded through holes 21, with which the test piece placed in the limiting groove 11 can be pressed tightly by bolts. Two sides of the cover 20 are provided with a plurality of through holes 22, which are symmetrically arranged and correspond to the thread through holes 13 on the two sides of the base 10, with which the cover 20 may be connected with the base 10 through bolts. An end of the cover 20 corresponding to the notch of the limiting groove 11 is formed with a through groove 23 configured for placing a stress ultrasonic detection probe on the test piece.

Because the end part of the test fixture and the gasket are subjected to the compression force from the test piece during the test, the test fixture according to an embodiment of the present disclosure is manufactured by material with the yield strength higher than that of the test piece, and meanwhile, the yield strength of the selected gasket is also higher than that of the test piece.

Figure 6:
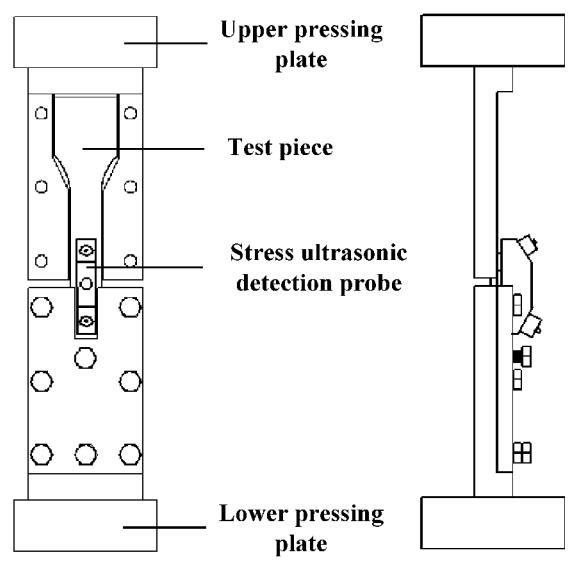
FIG. 6 is assembly and use schematic diagrams of the Bauschinger effect test fixture according to an embodiment of the present disclosure (in order to better show the structure of the fixture, the split body at the upper half part of the figure is not provided with the cover).

As shown in FIG. 6, when the test is perform by the test fixture provided by the present disclosure on the test machine for stretching and compressing materials, the bases 10 of the two split bodies are first horizontally placed at a flat place, and the gaskets with corresponding thickness are arranged at the end parts 12 of the limiting grooves 11 of the two bases 10 according to required compression length. Then, the end parts of the test piece to be compressed are arranged at the limiting grooves 11 of the two split bodies respectively, the covers 20 are connected to the bases 10 by bolts, the test piece is tightly pressed by applying bolts to the threaded through holes 21 on the covers 20, and the ultrasonic detection probe is placed at the through grooves of the covers 20. Finally, the connected test fixture is placed between an upper pressing plate and a lower pressing plate of the test machine for stretching and compressing materials, and the compression test of the test piece is performed after it is ensured that coupling of the stress ultrasonic detection probe and the test piece is good.

In the compression process of the test piece, a change in the compression force, a change in the compression stress when the material is yielded and a change in the compression stress when the compression force is unloaded can be effectively detected in real time by the stress ultrasonic detection probe, and meanwhile, the rule of a change in the compression stress when the material is compressed to failure is obtained.

After the test piece is subjected to compression plastic deformation, the tensile yield strength can be tested by using a conventional tensile tool, and the Bauschinger effect of the metal material is further verified.

In conclusion, the Bauschinger effect test fixture according to the embodiment of the present disclosure has the function of compressing and limiting the tested test piece, which ensures that the strip-shaped test piece is compressed only in a single direction of its length, and solves the problem of being bent and buckling when the material of the test piece is subjected to plastic deformation by using the compression function of the test machine for stretching and compressing materials.

The above are only the preferred embodiments of the present disclosure, and the scope of rights of the present disclosure should not be limited by this. It should be pointed out that a person skilled in the art may make many other improvements and changes without departing from the principle of the present disclosure, and the improvements and changes also should be regarded as falling within the protection scope of the present disclosure.

What is claimed is:

1. A Bauschinger effect test fixture, which cooperates with a test machine for stretching and compressing materials to perform a Bauschinger effect test on a test piece having a symmetrical strip-shaped configuration with two wide ends and a narrow middle part, wherein the test fixture comprises two identical split bodies, each split body comprising:
   a base provided, longitudinally from a central part to one end of the base, with a limiting groove corresponding to a half of the profile of the test piece, wherein two sides of the limiting groove are arranged symmetrically with a plurality of threaded through holes; and
   a cover provided along its central axis with two threaded through holes with which the test piece is pressed tightly by bolts, wherein two sides of the cover are arranged symmetrically with a plurality of through holes that are connected with the plurality of threaded through holes of the base through bolts, and wherein an end of the cover corresponding to a notch of the limiting groove is provided with a through groove configured for placing a stress ultrasonic detection probe on the test piece.

2. The Bauschinger effect test fixture of claim 1, wherein the other end of the base is provided with a protruding fixing part to which the test machine for stretching and compressing materials is fixedly connected through a pressing plate and applies a compression force.

3. The Bauschinger effect test fixture of claim 1, wherein an end of the limiting groove opposite the notch is arranged with gaskets with different thicknesses to generate different sizes of compressive stress on the test piece.

* * * * *